United States Patent
Khan et al.

(10) Patent No.: US 11,993,544 B1
(45) Date of Patent: *May 28, 2024

(54) GREEN CONCRETE KIT COMPOSED OF FOUR COMPONENTS

(71) Applicant: KING FAISAL UNIVERSITY, Al Hasa (SA)

(72) Inventors: Kaffayatullah Khan, Al Hasa (SA); Muhammad Nasir Amin, Al Hasa (SA); Megat Azmi Megat Johari, Al Hasa (SA)

(73) Assignee: KING FAISAL UNIVERSITY, Al Hasa (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,529

(22) Filed: Dec. 8, 2023

(51) Int. Cl.
*C04B 28/24* (2006.01)
*C04B 14/06* (2006.01)
*C04B 14/28* (2006.01)
*C04B 24/26* (2006.01)
*C04B 103/32* (2006.01)
*C04B 111/00* (2006.01)

(52) U.S. Cl.
CPC .......... *C04B 28/24* (2013.01); *C04B 14/068* (2013.01); *C04B 14/28* (2013.01); *C04B 24/2647* (2013.01); *C04B 2103/32* (2013.01); *C04B 2111/00017* (2013.01); *C04B 2201/52* (2013.01)

(58) Field of Classification Search
CPC ....... C04B 28/24; C04B 14/068; C04B 14/28; C04B 24/2647
See application file for complete search history.

(56) References Cited

U.S. PATENT DOCUMENTS

2014/0264140 A1* 9/2014 Gong .................. C04B 28/006
106/676
2020/0339477 A1* 10/2020 Ibrahim .............. C04B 28/006

FOREIGN PATENT DOCUMENTS

CN 110510949 A * 11/2019 ............ C04B 28/04

OTHER PUBLICATIONS

English machine translation of CN 110510949A. (Year: 2019).*
Wang et al. Cement-Based Materials Modified by Colloidal Nano-Silica: Impermeability Characteristic and Microstructure. Nanomaterials 2022, 12, 3176. Sep. 13, 2022 (Year: 2022).*
Tambara, Jr. et al. Effect of the nanosilica source on the rheology and early-age hydration of calcium sulfoaluminate cement pastes Construction and Building Materials 327 (2022) 126942 Feb. 24, 2022 (Year: 2022).*
Kahn et al. Optimization of colloidal nano-silica based cementitious mortar composites using RSM and ANN approaches. Results in Engineering 20 (2023) 101390 Sep. 4, 2023. (Year: 2023).*
Nauman Khurram et al., "Effect of Elevated Temperatures on Mortar with Naturally Occurring Volcanic Ash and Its Blend with Electric Arc Furnace Slag", Advances in Materials Science and Engineering, vol. 2018, pp. 1-11, First available online on Apr. 23, 2018.
Mohamed H. Mussa et al., "Fire Resistance of High-Volume Fly Ash RC Slab Inclusion with Nano-Silica", Materials (Basel), 14(12):3311, pp. 1-13, First available online on Jun. 15, 2021.
Abid Nadeem et al., "Mechanical performance, durability, qualitative and quantitative analysis of microstructure of fly ash and Metakaolin mortar at elevated temperatures", Construction and Building Materials, 38(2013), pp. 338-347, First available online on Sep. 29, 2012.
A.Kaur et al., "Use of Metakaolin as Pozzolanic Material and Partial Replacement with Cement in Concrete (M30)", Asian Review of Mechanical Engineering, 5(1), pp. 9-13, First available online on May 5, 2016.
Pengkun Hou et al., "Effects of Colloidal Nanosilica on Rheological and Mechanical Properties of Fly Ash-Cement Mortar", Cement & Concrete Composites, 35(2013), pp. 12-22, First available online on Sep. 11, 2012.
Kang Gao et al., "Effects SiO2/Na2O molar ratio on mechanical properties and the microstructure of nano-SiO2 metakaolin-based geopolymers", Construction and Building Materials, 53(2015), pp. 503-510, First available online on Jan. 4, 2014.

* cited by examiner

*Primary Examiner* — John E Uselding
(74) *Attorney, Agent, or Firm* — Nath, Goldberg & Meyer; Richard C. Litman

(57) ABSTRACT

A green concrete composition comprising: a binder component comprising Portland cement (C), volcanic ash (VA), metakaolin (MK), and colloidal nano-silica (CNS); an aggregate component comprising fine aggregates (FA) and coarse aggregates (CA); water (W); and a super plasticizer.

18 Claims, No Drawings

GREEN CONCRETE KIT COMPOSED OF FOUR COMPONENTS

FIELD AND BACKGROUND

The disclosure of the present application relates to composition of green concrete with Portland cement (C), natural basaltic volcanic ash pozzolan (VA), metakaolin (MK), and colloidal nano-sized silica particles (CNS).

DESCRIPTION OF THE PRIOR ART

Concrete is the most widely used building material in the world and the second most consumed material on the planet, after water. Global concrete consumption is estimated to be nearly twice that of all other building materials. The broad use of concrete stems from its strength, durability, effortless molding capability, water resistance, fire resistance, wind resistance, zero maintenance, soundproofing properties, cost-effectiveness, and versatility. Concrete use is set to rise as global urbanization and economic development increases demand for new buildings and infrastructures.

However, the production of Portland cement, an essential constituent of concrete, leads to the release of significant amount of carbon dioxide and other greenhouse gases into the atmosphere which contributes to global warming. It is estimated that about 8% of global carbon dioxide emission comes from cement production.

Carbon dioxide is emitted from both the calcination process and the heating of cement kiln. During calcination, calcium carbonate and clay are heated in a kiln to form quicklime. The formed quicklime fuses with minerals in the clay and cools down into clinker. Then the clinker is grounded to make cement powder. During the process of forming quicklime, carbon dioxide is emitted as a byproduct. The source of heat during calcination is typically from a coal or natural gas fired furnace, which releases massive amounts of carbon dioxide into the atmosphere.

In order to reduce the carbon dioxide emission associated with the manufacturing of Portland cement, researchers have suggested multiple techniques such as carbon capturing and utilization, clinker reduction, alternate fuel sources, and modifications in cement manufacturing. It has been suggested that using alternate materials that have pozzolanic properties or supplementary cementitious materials (SCM) as a replacement of clinker is the most effective way to reduce carbon dioxide emission.

Besides the reduction of carbon footprint, it is imperative that the replacement of clinker with pozzolanic materials or supplementary cementitious materials does not degrade the properties of the concrete, such as compressive strength and durability. In the context of the latter, there are several tests to determine durability of a concrete. Rapid chloride penetration (permeability) test and water absorption test are examples of test methods for determining a concrete's durability.

Rapid chloride penetration is a test performed to determine the depth to which chloride ions from the environment penetrate into the concrete. A high rapid chloride penetration value may lead to corrosion in the concrete and a subsequent reduction in strength, serviceability, and aesthetics of the structure. On the other hand, water absorption is a test performed to determine the susceptibility of an unsaturated concrete to the penetration of water. It measures the rate of absorption of water and other liquids into unsaturated concrete through capillary suction. Concretes with high water absorption value are more susceptible to durability-related damage and performance degradation.

Thus, an environmentally friendly method for producing green concrete with the desirable properties is needed.

SUMMARY

The present subject matter relates to a green concrete composition with Portland cement (C), natural basaltic volcanic ash pozzolan (VA), metakaolin (MK), and colloidal nano-sized silica particles (CNS) to improve compressive strength and durability performance after aging.

In one embodiment, the green concrete as described herein can be prepared by a method of producing green concrete includes homogenously dispersing colloidal nano-sized silica particles (CNS) in water (W) via sonication to obtain a homogenous solution; obtaining a blended mixture of Portland cement (C), natural basaltic volcanic ash pozzolan (VA), metakaolin (MK), and water (W); continuously mixing the blended mixture while adding the homogeneous solution to the blended mixture to obtain a blended mixture solution; continue mixing the blended mixture solution for about five minutes to obtain a homogeneous mixture; providing two molds; casting a layer of the homogenous mixture in each of the two molds; releasing trapped air from each of the layers of the homogenous mixture in the respective molds; compacting each of the layer of the homogenous mixture using the respective molds to obtain compacted homogeneous mixture layers; storing the compacted homogeneous mixture layers in the respective molds for a duration of time; demolding the stored compacted homogeneous mixture layers from the respective molds; and curing the demolded compacted homogeneous mixture layers to obtain green concrete.

In another embodiment, the present subject matter relates to a green concrete composition comprising: a binder component comprising Portland cement (C), volcanic ash (VA), metakaolin (MK), and colloidal nano-silica (CNS); an aggregate component comprising fine aggregates (FA) and coarse aggregates (CA); water (W); and a super plasticizer.

In an embodiment, the green concrete can be prepared by immersing the demolded compacted homogeneous mixture layers in water to cure the compacted homogeneous mixture layers at about 20° C.

In one embodiment, each 1 m$^3$ of green concrete can comprise 533 kg of the binder component, 1732 kg of the aggregate component; 160 kg of the water; and 6-8 kg of the super plasticizer.

In another embodiment, each 1 m$^3$ of green concrete can comprise 373 kg of the Portland cement, 133 kg of the natural basaltic volcanic ash pozzolan, 16 kg of the colloidal nano-silica, 11 kg of the metakaolin, 1039 kg of the coarse aggregates, 693 kg of the fine aggregates, 160 kg of the water, and 6.7 kg of the super plasticizer. In this regard, the green concrete can have a compressive strength of about 69.9 MPa, about 88.5 MPa, about 104.1 MPa, and about 106.2 MPa after aging for about 7 days, about 28 days, about 91 days, and about 365 days, respectively. Similarly, the green concrete can have a rapid chloride penetration of about 273 Coulombs and about 78 Coulombs after aging for about 91 days and about 365 days, respectively. Likewise, the green concrete can have a water absorption of about 2.52% and about 1.86% after aging for about 91 days and about 365 days, respectively.

In an additional embodiment, each 1 m$^3$ of green concrete can comprise 266.5 kg of the Portland cement, 213 kg of the natural basaltic volcanic ash pozzolan, 32 kg of the colloidal nano-silica, 21 kg of the metakaolin, 1039 kg of the coarse aggregates, 693 kg of the fine aggregates, 160 kg of the water, and 8 kg of the super plasticizer. In this regard, the green concrete can have a compressive strength of about 61.9 MPa, about 83.2 MPa, about 91.4 MPa, and about 96.1 MPa after aging for about 7 days, about 28 days, about 91 days, and about 365 days, respectively. Similarly, the green concrete can have a rapid chloride penetration of about 269 Coulombs and about 39 Coulombs after aging for about 91 days and about 365 days, respectively. Likewise, the green concrete can have a water absorption of about 2.19% and about 2.09% after aging for about 91 days and about 365 days, respectively.

In a further embodiment, each 1 m³ of green concrete can comprise 373 kg of the Portland cement, 133 kg of the natural basaltic volcanic ash pozzolan, 11 kg of the colloidal nano-silica, 16 kg of the metakaolin, 1039 kg of the coarse aggregates, 693 kg of the fine aggregates, 160 kg of the water, and 6.4 kg of the super plasticizer. In this regard, the green concrete can have a compressive strength of about 71.5 MPa, about 87.4 MPa, about 107.7 MPa, and about 106.2 MPa after aging for about 7 days, about 28 days, about 91 days, and about 365 days, respectively. Similarly, the green concrete can have a rapid chloride penetration of about 337 Coulombs and about 35 Coulombs after aging for about 91 days and about 365 days, respectively. Likewise, the green concrete can have a water absorption of about 2.58% and about 2.00% after aging for about 91 days and about 365 days, respectively.

In another embodiment, each 1 m³ of green concrete can comprise 266.5 kg of the Portland cement, 213 kg of the natural basaltic volcanic ash pozzolan, 21 kg of the colloidal nano-silica, 32 kg of the metakaolin, 1039 kg of the coarse aggregates, 693 kg of the fine aggregates, 160 kg of the water, and 7.5 kg of the super plasticizer. In this regard, the green concrete can have a compressive strength of about 57.7 MPa, about 78.2 MPa, about 85.2 MPa, and about 92.7 MPa after aging for about 7 days, about 28 days, about 91 days, and about 365 days, respectively. Similarly, the green concrete can have a rapid chloride penetration of about 303 Coulombs and about 30 Coulombs after aging for about 91 days and about 365 days, respectively. Likewise, the green composition can have a water absorption of about 2.37% and about 2.01% after aging for about 91 days and about 365 days, respectively.

In a further embodiment, the green concrete can include fine aggregates comprising dune silica sand, coarse aggregates comprising crushed limestone, and a super plasticizer comprising polycarboxylate ethers.

In an embodiment, the mixing can be conducted in a concrete mixer comprising a pan type concrete mixer with a mixing capacity of about 40 L to about 50 L.

In an embodiment, the homogeneous solution can be prepared by adding the colloidal nano-sized silica particles to the water at a ratio of about 50% of the colloidal nano-sized silica particles to about 50% of the water, by weight.

In an embodiment, the colloidal nano-sized silica particles can have a density of about 1.4 g/cm³, a pH of about 9.5, a viscosity of about 8 cP, about 50% by weight of silica, a diameter of about 35 nm to about 75 nm, and a specific surface area of about 80 m²/g.

In an embodiment, the natural basaltic volcanic ash pozzolan, the metakaolin, and the colloidal nano-sized silica particles can have a Chappelle activity (mg $Ca(OH)_2$/g sample) of about 821.48, about 1311.3, and about 1402.5, respectively.

In another embodiment, the Portland cement, the natural basaltic volcanic ash pozzolan, and the metakaolin can have a BET surface area of about 0.374 m²/g, about 0.356 m²/g, and about 12.507 m²/g, respectively.

In another embodiment, the trapped air can be released by rodding each of the layers of the homogenous mixture in the respective molds.

In another embodiment, the stored compacted homogeneous mixture layers can be demolded from the respective molds about 24 hours after the casting step.

In a further embodiment, the present subject matter relates to green concrete prepared by the above method.

These and other features of the present subject matter will become readily apparent upon further review of the following specification.

DETAILED DESCRIPTION

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of producing green concrete with Portland cement (C), natural basaltic volcanic ash pozzolan (VA), metakaolin (MK), and colloidal nano-sized silica particles (CNS) to improve compressive strength and durability performance after aging.

In this regard, the present subject matter further relates to a green concrete composition comprising: a binder component comprising Portland cement (C), volcanic ash (VA), metakaolin (MK), and colloidal nano-silica (CNS); an aggregate component comprising fine aggregates (FA) and coarse aggregates (CA); water (W); and a super plasticizer.

In one embodiment, the method of producing green concrete includes homogenously dispersing colloidal nano-sized silica particles (CNS) in water (W) via sonication to obtain a homogenous solution; obtaining a blended mixture of Portland cement (C), natural basaltic volcanic ash pozzolan (VA), metakaolin (MK), and water (W); continuously mixing the blended mixture while adding the homogeneous solution to the blended mixture to obtain a blended mixture solution; continue mixing the blended mixture solution for about five minutes to obtain a homogeneous mixture; providing two molds; casting a layer of the homogenous mixture in each of the two molds; releasing trapped air from each of the layers of the homogenous mixture in the respective molds; compacting each of the layer of the homogenous mixture using the respective molds to obtain compacted homogeneous mixture layers; storing the compacted homogeneous mixture layers in the respective molds for a duration of time; demolding the stored compacted homogeneous mixture layers from the respective molds; and curing the demolded compacted homogeneous mixture layers to obtain green concrete.

In a further embodiment, the present subject matter relates to green concrete prepared by the above method.

In an embodiment, the method can include adding the colloidal nano-sized silica particles and the water to a sonicator at a ratio of about 50% of the colloidal nano-sized silica particles to about 50% of the water, by weight. Then the sonicator can be turned on to homogenously disperse the colloidal nano-sized silica particles in the water to obtain a homogenous solution.

In an embodiment, a cement mixture of the Portland cement, the natural basaltic volcanic ash pozzolan, the metakaolin, and the water can be added to a pan type concrete mixer with a mixing capacity of about 40 L to about 50 L. In an embodiment, the binder mixture can include about 0.5% to about 0.7% of the Portland cement, about 0.25% to about 0.40% of the natural basaltic volcanic ash pozzolan, about 0.02% to about 0.06% of the metakaolin, about 0.02% to about 0.06% of the colloidal nano-sized silica particles, and about 0.30% of the water to the total weight of binder component, by weight. In an embodiment, the binder mixture can include about 0.70% of the Portland cement, about 0.25% of the natural basaltic volcanic ash pozzolan, about 0.02% of the metakaolin, and about 0.03% of the colloidal nano-sized silica particles, by weight. In an embodiment, the binder mixture can include about 0.70% of the Portland cement, about 0.25% of the natural basaltic volcanic ash pozzolan, about 0.03% of the metakaolin, and about 0.02% of the colloidal nano-sized silica particles, by weight. In an embodiment, the colloidal nano-sized silica particles can have a density of about 1.4 g/cm$^3$, a pH of about 9.5, a viscosity of about 8 cP, about 50% by weight of silica, a diameter of about 35 nm to about 75 nm, and a specific surface area of about 80 m$^2$/g. In an embodiment, the cement mixture can further include a fine aggregate (dune silica sand), a coarse aggregate (crushed limestone), and a super plasticizer (polycarboxylate ethers).

The cement mixture can be mixed for about three minutes or more to obtain a blended mixture. The blended mixture can be continuously mixed while the homogeneous solution can be added to the blended mixture to obtain a blended mixture solution. The mixing can be stopped for about three minutes. Afterward, mixing of the blended mixture solution can be continued for about five minutes to obtain a homogenous mixture.

In an embodiment, two molds can be provided. A layer of the homogenous mixture can be casted into each of the two molds. Afterward, each of the layers of the homogenous mixture in the respective molds can be rodded to release trapped air from each of the layers of the homogenous mixture. Thereafter, each of the layers of the homogenous mixture can be compacted using the respective molds to obtain compacted homogeneous mixture layers.

In an embodiment, the compacted homogeneous mixture layers in the respective molds can be stored in a laboratory for a duration of time.

In an embodiment, about 24 hours after the casting step, the stored compacted homogeneous mixture layers can be demolded from the respective molds. Afterward, the demolded compacted homogeneous mixture layers can be immersed in water to cure the compacted homogeneous mixture layers at about 20° ° C. to obtain green concrete.

In an embodiment, the green concrete can have a compressive strength of about 69.9 MPa, about 88.5 MPa, about 104.1 MPa, and about 106.2 MPa after aging for about 7 days, about 28 days, about 91 days, and about 365 days, respectively. In an embodiment, the green concrete can have a compressive strength of about 71.5 MPa, about 87.4 MPa, about 107.7 MPa, and about 106.2 MPa after aging for about 7 days, about 28 days, about 91 days, and about 365 days, respectively.

In an embodiment, the green concrete can have a rapid chloride penetration of about 273 Coulombs and about 78 Coulombs after aging for about 91 days and about 365 days, respectively. In an embodiment, the green concrete can have a rapid chloride penetration of about 337 Coulombs and about 35 Coulombs after aging for about 91 days and about 365 days, respectively.

In an embodiment, the green concrete can have a water absorption of about 2.52% and about 1.86% after aging for about 91 days and about 365 days, respectively. In an embodiment, the green concrete can have a water absorption of about 2.58% and about 2.00% after aging for about 91 days and about 365 days, respectively.

In an embodiment, the natural basaltic volcanic ash pozzolan, the metakaolin, and the colloidal nano-sized silica particles can have a Chappelle activity (mg $Ca(OH)_2$/g sample) of about 821.48, about 1311.3, and about 1402.5, respectively.

In an embodiment, the Portland cement, the natural basaltic volcanic ash pozzolan, and the metakaolin can have a BET surface area of about 0.374 $m^2$/g, about 0.356 $m^2$/g, and about 12.507 $m^2$/g, respectively.

The following examples illustrate the present teachings.

EXAMPLES

Example 1

Preparation of Green Concrete

The process of producing green concrete was conducted using the following steps.

Preparation of homogenous solution: Colloidal nano-sized silica particles and water were added to a sonicator at a ratio of about 50% of the colloidal nano-sized silica particles to about 50% of the water, by weight. Then the sonicator was turned on to homogenously disperse the colloidal nano-sized silica particles in the water to obtain a homogenous solution.

Mixing of cement mixture: A cement mixture of Portland cement, natural basaltic volcanic ash pozzolan, metakaolin, water, fine aggregate (dune silica sand), coarse aggregate (crushed limestone), and super plasticizer (polycarboxylate ethers) was added to a pan type concrete mixer with a mixing capacity of about 40 L to about 50 L. The cement mixture was then mixed for about three minutes or more to obtain a blended mixture. The blended mixture was continuously mixed while the homogeneous solution was added to the blended mixture to obtain a blended mixture solution. The mixing was then stopped for about three minutes. Afterward, mixing of the blended mixture solution was continued for about five minutes to obtain a homogenous mixture. The mixing was conducted according to ASTM C192 (ASTM C 192/C 192M-02, 2018) standard practice.

Molding: Two molds were provided. A layer of the homogenous mixture was casted into each of the two molds. Afterward, each of the layers of the homogenous mixture in the respective molds was rodded to release trapped air from each of the layers of the homogenous mixture. Thereafter, each of the layers of the homogenous mixture was compacted using the respective molds to obtain compacted homogeneous mixture layers.

Storage: The compacted homogeneous mixture layers in the respective molds were stored in a laboratory for a duration of time.

Demolding and curing: About 24 hours after the casting step, the stored compacted homogeneous mixture layers were demolded from the respective molds. Afterward, the demolded compacted homogeneous mixture layers were immersed in water to cure the compacted homogeneous mixture layers at about 20° ° C. to obtain green concrete.

The obtained green concrete was produced using one of the cement mixture proportions shown in Table 1 (about 70C-25VA-3CNS-2MK or about 50C-40VA-6CNS-4MK or about 70C-25VA-3MK-2CNS or about 50C-40VA-6MK-4CNS). The above process was repeated for the rest of the mentioned cement mixture proportions to produce a plurality of green concretes from four different concrete mixture proportions. For the purpose of aging, as described below, the above process was also repeated for all four cement mixture proportions to produce a plurality of concrete green concretes.

The chemical compositions of the Portland cement, the natural basaltic volcanic ash pozzolan, the metakaolin, and the colloidal nano-sized silica particles are shown in Table 2. The BET surface area and the particle size distribution of the Portland cement, the natural basaltic volcanic ash pozzolan, the metakaolin, and the colloidal nano-sized silica particles are shown in Table 3. The physical properties of the colloidal nano-sized silica particles are shown in Table 4.

TABLE 1

Cement mixture proportions

| | Proportions by weight (%) | | | | | | | |
|---|---|---|---|---|---|---|---|---|
| | Binder | | | | Aggregates | | Water | Super Plasticizer |
| Mix ID | C | VA | CNS | MK | FA | CA | W | SP |
| C100 | 1 | — | — | — | 1.30 | 1.95 | 0.30 | 1.20 |
| 70C-25VA-3CNS-2MK | 0.7 | 0.25 | 0.03 | .02 | 1.30 | 1.95 | 0.30 | 1.25 |
| 50C-40VA-6CNS-4MK | 0.5 | 0.4 | 0.06 | .04 | 1.30 | 1.95 | 0.30 | 1.50 |
| 70C-25VA-3MK-2CNS | 0.7 | 0.25 | 0.02 | .03 | 1.30 | 1.95 | 0.30 | 1.20 |
| 50C-40VA-6MK-4CNS | 0.5 | 0.4 | 0.04 | .06 | 1.30 | 1.95 | 0.30 | 1.40 |

TABLE 1-continued

Cement mixture proportions

Proportions by weights (kg/m³ of concrete)

| Mix ID | Binder | | | | Aggregates | | Water | Super Plasticizer |
| --- | --- | --- | --- | --- | --- | --- | --- | --- |
| | C | VA | CNS | MK | FA | CA | W | SP |
| C100 | 533 | — | — | — | 693 | 1039 | 160 | 6.5 |
| 70C-25VA-3CNS-2MK | 373 | 133 | 16 | 11 | 693 | 1039 | 160 | 6.7 |
| 50C-40VA-6CNS-4MK | 267 | 213 | 32 | 21 | 693 | 1039 | 160 | 8.0 |
| 70C-25VA-3MK-2CNS | 373 | 133 | 11 | 16 | 693 | 1039 | 160 | 6.4 |
| 50C-40VA-6MK-4CNS | 267 | 213 | 21 | 32 | 693 | 1039 | 160 | 7.5 |

Note:
C = Portland cement, VA = volcanic ash, CNS = colloidal nano-sized particles, MK = metakaolin, FA = fine aggregate (dune silica sand), CA = coarse aggregate (crushed limestones), SP = super plasticizer (polycarboxylate ethers)

The concrete mix proportions as shown in Table 1 are based on the number of kilograms designed for 1 m³ of concrete. In this regard, the concrete as shown has four main components: a binder component, an aggregate component, water, and an admixture, or super plasticizer.

In this regard, in Table 1, the total binder component required to produce 1 m³ of concrete is 533 kg. The total aggregate component required to produce 1 m³ of concrete is 1732 kg. The water component required to produce 1 m³ of concrete is 160 kg. And the admixture, or super plasticizer, component required to produce 1 m³ of concrete is 6.5-7.5 kg.

Regarding Mix 1 (70C-25VA-3NS-2MK), as shown in Table 1, the binder component required to produce 1 m³ of concrete contains 373 kg (70%) of cement, 133 kg (25%) of volcanic ash (VA), 16 kg (3%) of colloidal nanosilica (CNS) and 11 kg (2%) of metakaolin (MK). The aggregate components required to produce 1 m³ of concrete contain coarse aggregate (CA) 1039 kg and fine aggregate (FA) 693 kg. The water component required to produce 1 m³ of concrete is 160 kg. And the Admixture/super plasticizer component required to produce 1 m³ of concrete is 6.7 kg.

Regarding Mix 2 (50C-40VA-6NS-4MK), as shown in Table 1, the binder component required to produce 1 m³ of concrete contains 266.5 kg (50%) of cement, 213 kg (40%) of volcanic ash (VA), 32 kg (6%) of colloidal nanosilica (CNS), and 21 kg (4%) of metakaolin (MK). The aggregate components required to produce 1 m³ of concrete contain coarse aggregate (CA) 1039 kg and fine aggregate (FA) 693 kg. The water component required to produce 1 m³ of concrete is 160 kg. And the Admixture/super plasticizer component required to produce 1 m³ of concrete is 8.0 kg.

Regarding Mix 3 (70C-25VA-3MK-2NS), as shown in Table 1, the binder component required to produce 1 m³ of concrete contains 373 kg (70%) of volcanic ash (VA) and 16 kg (3%) of metakaolin (MK), and 11 kg (2%) of colloidal nanosilica (CNS). The aggregate components required to produce 1 m³ of concrete contains coarse aggregate (CA) 1039 kg and fine aggregate (FA) 693 kg. The water component required to produce 1 m³ of concrete is 160 kg. And the Admixture/super plasticizer component required to produce 1 m³ of concrete is 6.4 kg.

Regarding Mix 4 (50C-40VA-6MK-4NS), as shown in Table 1, the binder component required to produce 1 m³ of concrete contains 266.5 kg (50%) of cement, 213 kg (40%) of volcanic ash (VA), 32 kg (6%) of metakaolin (MK), and 21 kg (4%) of colloidal nanosilica (CNS). The aggregate components required to produce 1 m³ of concrete contain coarse aggregate (CA) 1039 kg and fine aggregate (FA) 693 kg. The water component required to produce 1 m³ of concrete is 160 kg. And the admixture component required to produce 1 m³ of concrete is 7.5 kg.

TABLE 2

Chemical compositions of Portland cement (C), volcanic ash (VA), metakaolin (MK), and colloidal nano-sized silica particles (CNS)

| | Chemical composition (oxides, % by weight) | | | |
| --- | --- | --- | --- | --- |
| | C | VA | MK | CNS |
| $SiO_2$ | 21.6 | 48.97 | 54.41 | 99.9 |
| $Al_2O_3$ | 5.56 | 16.06 | 38.63 | — |
| $Fe_2O_3$ | 3.48 | 10.91 | 3.83 | — |
| $SiO_2 + Al_2O_3 + Fe_2O_3$ | — | 75.94 | 96.87 | 99.9 |
| CaO | 63.3 | 9.11 | 1.18 | — |
| MgO | 0.73 | 7.91 | 0.17 | — |
| $Na_2O$ | 0.15 | 4.28 | 0.0 | — |
| $K_2O$ | 0.52 | 0.71 | 0.0 | — |
| $SO_3$ | 2.35 | 0.01 | 0.0 | — |
| Cl | — | 0.03 | 0.0 | — |
| LOI | 2.31 | 1.91 | 1.52 | — |

TABLE 3

BET surface area and particle size distribution of the materials

| Binder type | BET surface area ($m^2/g$) | Diameter for Selected percentiles by volume | | |
| --- | --- | --- | --- | --- |
| | | $D_{10}$ (um)** | $D_{50}$ (um)** | $D_{90}$ (um)** |
| C | 0.374 | 0.78 | 9.24 | 20.13 |
| VA | 0.356 | 3.44 | 12.21 | 28.33 |
| MK | 12.507 | 0.91 | 3.92 | 9.51 |
| CNS | 80.0* | — | — | — |

*Surface area of CNS was measured by titration method.
**$D_{10}$, $D_{50}$ and $D_{90}$ represent the particle sizes of 10%, 50% and 90% of the materials sample.

TABLE 4

Physical properties of colloidal nano-sized silica (CNS)

| ID | Purity (%) | Density (g/cm³) | pH | Viscosity (cP) | Silica (%) by weight | Diameter (nm) | Specific surface area (m²/g) |
| --- | --- | --- | --- | --- | --- | --- | --- |
| CNS | 99.9 | 1.4 | 9.5 | 8 | 50* | 35-75 | 80 |

*CNS includes 50% $SiO_2$ and 50% water.

Example 2

Preparation of Portland Cement-Based Concrete (Control)

The process of producing Portland cement-based concrete was conducted using the following steps.

Mixing of Portland cement: A cement mixture of Portland cement, water, fine aggregate (dune silica sand), coarse aggregate (crushed limestone), and super plasticizer (polycarboxylate ethers) was added to a pan type concrete mixer with a mixing capacity of about 40 L to about 50 L. The cement mixture was then mixed for about three minutes or more to obtain a blended mixture. The mixing was then stopped for about three minutes. Afterward, mixing of the blended mixture was continued for about five minutes to obtain a homogenous mixture. The mixing was conducted according to ASTM C192 (ASTM C 192/C 192M-02, 2018) standard practice.

Molding: Two molds were provided. A layer of the homogenous mixture was casted into each of the two molds. Afterward, each of the layers of the homogenous mixture in the respective molds was rodded to release trapped air from each of the layers of the homogenous mixture. Thereafter, each of the layers of the homogenous mixture was compacted using the respective molds to obtain compacted homogeneous mixture layers.

Storage: The compacted homogeneous mixture layers in the respective molds were stored in a laboratory for a duration of time.

Demolding and curing: About 24 hours after the casting step, the stored compacted homogeneous mixture layers were demolded from the respective molds. Afterward, the demolded compacted homogeneous mixture layers were immersed in water to cure the compacted homogeneous mixture layers at about 20° ° C. to obtain Portland cement-based concrete.

The obtained Portland cement-based concrete was produced using the mixture proportion (C100) shown in Table 1. For the purpose of aging, as described below, the above process was repeated several times using the same mixture proportion (C100) to produce a plurality of Portland cement-based concretes. These concretes were used as a control.

Example 3

Compressive Strength After Ageing

The obtained plurality of green concretes and Portland cement-based concretes produced by the methods described above were individually aged. During the aging process, one of each of the plurality of green concretes and Portland cement-based concretes were aged at about 7 days. The same procedure was conducted for aging at about 28 days, about 91 days, and about 365 days. All of the aged green concretes and Portland cement-based concretes were then used for compressive strength testing.

As shown in Table 5, the green concretes with cement mixture proportions containing about 70C-25VA-3CNS-2MK and about 70C-25VA-3MK-2CNS provided higher overall compressive strengths for all the aging days relative to the Portland cement-based concretes. These data indicate that partially substituting Portland cement with supplementary cementitious materials (SCM) such as natural basaltic volcanic ash pozzolan, metakaolin, and the colloidal nano-sized silica particles in a cement mixture provide a higher compressive strength relative to a cement mixture having about 100% by weight of the Porland cement. However, for green concretes containing cement mixture proportions of about 50C-40VA-6CNS-4MK and about 50C-40VA-6CNS-4MK, the compressive strengths were lower for most of the aging days relative to the Portland cement-based concretes.

TABLE 5

Average compressive strength at about 7 days, about 28 days, about 91 days, and about 365 days aging

| Mixes ID | Compressive Strength (MPa) | | | |
|---|---|---|---|---|
| | 7 days | 28 days | 91 days | 365 days |
| C100 | 62 | 78.3 | 98.5 | 102 |
| 70C-25VA-3CNS-2MK | 69.9 | 88.5 | 104.1 | 106.2 |
| 50C-40VA-6CNS-4MK | 61.9 | 83.2 | 91.4 | 96.1 |
| 70C-25VA-3MK-2CNS | 71.5 | 87.4 | 107.7 | 106.2 |
| 50C-40VA-6MK-4CNS | 57.7 | 78.2 | 85.2 | 92.7 |

Note:
About 24 hours after the casting step, concrete specimens were demolded and moist cured under standard laboratory conditions at about 20° C. Afterward, the cured concrete specimens were aged for about 7 days, about 28 days, about 91 days, and about 365 days.

Example 4

Rapid Chloride Penetration and Water Absorption after Ageing

The obtained plurality of green concretes and Portland cement-based concretes produced by the methods described above were individually aged. During the aging process, one of each of the plurality of green concretes and Portland cement-based concretes were aged at about 91 days. The same procedure was conducted for aging at about 365 days. All of the aged green concretes and Portland cement-based concretes were then used for rapid chloride penetration testing and water absorption testing.

As shown in Table 6, the green concretes with cement mixture proportions containing about 70C-25VA-3CNS-2MK, about 50C-40VA-6CNS-4MK, about 70C-25VA-3MK-2CNS, and about 50C-40VA-6MK-4CNS exhibited lower overall rapid chloride penetration and water absorption values for all the aging days relative to the Portland cement-based concretes. These data show that partially substituting Portland cement with supplementary cementitious materials (SCM) such as natural basaltic volcanic ash pozzolan, metakaolin, and the colloidal nano-sized silica particles in a cement mixture provide lower rapid chloride penetration and water absorption values relative to a cement mixture having about 100% by weight of the Porland cement. The lower rapid chloride penetration and water absorption values resulted in improved durability performance of the green concretes.

TABLE 6

Rapid chloride penetration and water absorption of different concretes

| Mixes ID | Rapid Chloride Penetration Test (Coulombs) | | Water Absorption (%) | |
|---|---|---|---|---|
| | 91 days | 365 days | 91 days | 365 days |
| C100 | 1038 | 409 | 3.20 | 2.81 |
| 70C-25VA-3CNS-2MK | 273 | 78 | 2.52 | 1.86 |
| 50C-40VA-6CNS-4MK | 269 | 39 | 2.19 | 2.09 |

TABLE 6-continued

Rapid chloride penetration and water absorption of different concretes

| Mixes ID | Rapid Chloride Penetration Test (Coulombs) | | Water Absorption (%) | |
|---|---|---|---|---|
| | 91 days | 365 days | 91 days | 365 days |
| 70C-25VA-3MK-2CNS | 337 | 35 | 2.58 | 2.00 |
| 50C-40VA-6MK-4CNS | 303 | 30 | 2.37 | 2.01 |

Note:
About 24 hours after the casting step, concrete specimens were demolded and moist cured under standard laboratory conditions at about 20° C. Afterward, the cured concrete specimens were aged for about 91 days and about 365 days, Rapid chloride penetration test (RCPT) of the concrete specimens were conducted according to ASTM C1202 specifications (ASTM C1202, 2012). The water absorption of the concrete specimens were measured in accordance with ASTM C948 (2016), 2016).

Example 5

Chappelle Reactivity Analysis

A Chappelle reactivity test was conducted for the natural basaltic volcanic ash pozzolan (VA), the metakaolin (MK), and the colloidal nano-sized silica particles (CNS) to evaluate the reactivity of the mentioned materials. Data from the test is shown in Table 7. The Chappelle reactivity test is used as an indicator of how much of the calcium oxide (CaO) is utilized by the mentioned materials. A higher value means more calcium oxide consumption. As can be seen from the test results shown in Table 7, the colloidal nano-sized silica particles sample demonstrated the highest reactivity.

TABLE 7

Chappelle reactivity analysis of VA, MK, and CNS

| Materials IDs | Chappelle activity (mg Ca (OH)$_2$/g sample) |
|---|---|
| VA | 821.48 |
| MK | 1311.3 |
| CNS | 1402.5 |

It is to be understood that the method for producing green concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A green concrete composition comprising:
   a binder component comprising Portland cement (C), volcanic ash (VA), metakaolin (MK), and colloidal nano-silica (CNS);
   an aggregate component comprising fine aggregates (FA) and coarse aggregates (CA);
   water (W); and
   a super plasticizer, wherein the Portland cement, the volcanic ash, and the metakaolin have a BET surface area of about 0.374 m$^2$/g, about 0.356 m$^2$/g, and about 12.507 m$^2$/g, respectively.

2. The green concrete of claim 1, wherein each 1 m$^3$ of the green concrete comprises 533 kg of the binder component, 1732 kg of the aggregate component; 160 kg of the water; and 6-8 kg of the super plasticizer.

3. The green concrete of claim 1, wherein each 1 m$^3$ of the green concrete comprises 373 kg of the Portland cement, 133 kg of the volcanic ash, 16 kg of the colloidal nano-silica, 11 kg of the metakaolin, 1039 kg of the coarse aggregates, 693 kg of the fine aggregates, 160 kg of the water, and 6.7 kg of the super plasticizer.

4. The green concrete of claim 1, wherein each 1 m$^3$ of the green concrete comprises 266.5 kg of the Portland cement, 213 kg of the volcanic ash, 32 kg of the colloidal nano-silica, 21 kg of the metakaolin, 1039 kg of the coarse aggregates, 693 kg of the fine aggregates, 160 kg of the water, and 8 kg of the super plasticizer.

5. The green concrete of claim 1, wherein each 1 m$^3$ of the green concrete comprises 373 kg of the Portland cement, 133 kg of the volcanic ash, 11 kg of the colloidal nano-silica, 16 kg of the metakaolin, 1039 kg of the coarse aggregates, 693 kg of the fine aggregates, 160 kg of the water, and 6.4 kg of the super plasticizer.

6. The green concrete of claim 1, wherein each 1 m$^3$ of the green concrete comprises 266.5 kg of the Portland cement, 213 kg of the volcanic ash, 21 kg of the colloidal nano-silica, 32 kg of the metakaolin, 1039 kg of the coarse aggregates, 693 kg of the fine aggregates, 160 kg of the water, and 7.5 kg of the super plasticizer.

7. The green concrete of claim 3, wherein the green concrete has a compressive strength of about 69.9 MPa, about 88.5 MPa, about 104.1 MPa, and about 106.2 MPa after aging for about 7 days, about 28 days, about 91 days, and about 365 days, respectively.

8. The green concrete of claim 3, wherein the green concrete has a rapid chloride penetration of about 273 Coulombs and about 78 Coulombs after aging for about 91 days and about 365 days, respectively.

9. The green concrete of claim 3, wherein the green concrete has a water absorption of about 2.52% and about 1.86% after aging for about 91 days and about 365 days, respectively.

10. The green concrete of claim 5, wherein the green concrete has a compressive strength of about 71.5 MPa, about 87.4 MPa, about 107.7 MPa, and about 106.2 MPa after aging for about 7 days, about 28 days, about 91 days, and about 365 days, respectively.

11. The green concrete of claim 5, wherein the green concrete has a rapid chloride penetration of about 337 Coulombs and about 35 Coulombs after aging for about 91 days and about 365 days, respectively.

12. The green concrete of claim 5, wherein the green concrete has a water absorption of about 2.58% and about 2.00% after aging for about 91 days and about 365 days, respectively.

13. The green concrete of claim 4, wherein the green concrete has a compressive strength of about 61.9 MPa, about 83.2 MPa, about 91.4 MPa, and about 96.1 MPa after aging for about 7 days, about 28 days, about 91 days, and about 365 days, respectively.

14. The green concrete of claim 4, wherein the green concrete has a rapid chloride penetration of about 269 Coulombs and about 39 Coulombs after aging for about 91 days and about 365 days, respectively and a water absorption of about 2.19% and about 2.09% after aging for about 91 days and about 365 days, respectively.

15. The green concrete of claim 6, wherein the green concrete has a compressive strength of about 57.7 MPa, about 78.2 MPa, about 85.2 MPa, and about 92.7 MPa after aging for about 7 days, about 28 days, about 91 days, and about 365 days, respectively.

16. The green concrete of claim 6, wherein the green concrete has a rapid chloride penetration of about 303 Coulombs and about 30 Coulombs after aging for about 91 days and about 365 days, respectively, and a water absorption of about 2.37% and about 2.01% after aging for about 91 days and about 365 days, respectively.

17. The green concrete of claim 1, wherein the fine aggregates comprise dune silica sand, the coarse aggregates comprise crushed limestone, and the super plasticizer comprises polycarboxylate ethers.

18. The green concrete of claim 1, wherein the colloidal nano-sized silica particles have a density of about 1.4 g/cm$^3$, a pH of about 9.5, a viscosity of about 8 cP, about 50% by weight of silica, a diameter of about 35 nm to about 75 nm, and a specific surface area of about 80 m$^2$/g.

\* \* \* \* \*

UNITED STATES PATENT AND TRADEMARK OFFICE
CERTIFICATE OF CORRECTION

| | | |
|---|---|---|
| PATENT NO. | : 11,993,544 B1 | Page 1 of 1 |
| APPLICATION NO. | : 18/534529 | |
| DATED | : May 28, 2024 | |
| INVENTOR(S) | : Kaffayatullah Khan, Muhammad Nasir Amin and Megat Azmi Megat Johari | |

It is certified that error appears in the above-identified patent and that said Letters Patent is hereby corrected as shown below:

On the Title Page

Item (72) Inventors, please delete the third Inventor city "Al Hasa, (SA)" and replace with "Penang, (MY)".

Signed and Sealed this
Twenty-fifth Day of June, 2024

Katherine Kelly Vidal
*Director of the United States Patent and Trademark Office*